Oct. 13, 1970 V. H. NELSON 3,534,193
TRANSMISSION-LINE SWITCH FOR CROSS-BAR SWITCHING
OF VERY HIGH POWER AT RADIO FREQUENCIES
Filed Jan. 3, 1968 7 Sheets-Sheet 1

INVENTOR.
BY VICTOR H. NELSON
Alfred W. Barber
ATTORNEY

INVENTOR.
VICTOR H. NELSON
BY Alfred W. Barber
ATTORNEY

INVENTOR.
VICTOR H. NELSON
BY
Alfred W. Barber
ATTORNEY

INVENTOR.
VICTOR H. NELSON
BY
Alfred W. Barber
ATTORNEY

INVENTOR.
VICTOR H. NELSON
BY
Alfred W. Barber
ATTORNEY

INVENTOR.
VICTOR H. NELSON
BY
Alfred W. Barber
ATTORNEY

INVENTOR.
VICTOR H. NELSON
BY
Alfred W. Barber
ATTORNEY

United States Patent Office 3,534,193

Patented Oct. 13, 1970

3,534,193

TRANSMISSION-LINE SWITCH FOR CROSS-BAR SWITCHING OF VERY HIGH POWER AT RADIO FREQUENCIES

Victor H. Nelson, Huntington, N.Y., assignor to Ramcor Incorporated, Huntington, N.Y., a corporation of New York Filed Jan. 3, 1968, Ser. No. 695,499
Int. Cl. H01h *67/26*
U.S. Cl. 200—153 10 Claims

ABSTRACT OF THE DISCLOSURE

A radio frequency transmission line switch for handling high power radio frequency energy consisting of a first rigid two conductor RF transmission line, a second rigid two conductor RF line, maintained at a right angle and stacked above the first RF line, and a movable switch consisting of a pair of interconnecting bars of substantially equal length for interconnecting the first and second RF lines in order to maintain the line impedance substantially constant through the switch.

CROSS-REFERENCE TO RELATED APPLICATIONS

There are no related applications.

BACKGROUND OF THE INVENTION

(1) Field of the invention

The present invention relates to radio frequency transmission-line cross-bar switches capable of handling very high power at radio frequencies.

(2) Description of the prior art

Prior art switches for the purpose of switching very high power radio frequencies have been very large, cumbersome, inefficient and subject to many difficulties such as voltage breakdown and overheating.

SUMMARY

The basic function of the switch in accordance with the present invention is to either conduct current straight through from an incoming transmission line to an outgoing transmission line in the same direction or to change the transmission from the incoming line to an outgoing line at right angles. Since the crossing transmission lines cannot be in the same plane, the switching to the perpendicular line must also transfer from the incoming line on one plane to the outgoing line in another plane. The impedance of the incoming and outgoing transmission lines are maintained by maintaining uniform separation between the two blades or sides of the switch in both the straight through and plane changing conditions. The switch contacts are sliding and provide sufficient contact area to carry the very heavy currents involved with no appreciable loss and hence without appreciable heating. The unused switch blades in each condition are removed from the transmission path and are grounded to the transmission line shield. This prevents spurious responses due to parasitic circuits formed by these switch blades and fortuitously coupled to the lines carrying current.

All transmission lines are enclosed in a grounded shield duct and are insulated therefrom by special high voltage, low loss insulators.

The mechanism for actuating the switch includes a motor driving a worm gear which in turn drives a worm coupled to the active switch parts through a spring device permitting over-drive in each direction to insure full closing of the switch. In operation the motor is energized moving the active switch parts from one position to the other and overdriving as permitted by the spring bias means and finally actuating a switch to cut-off the motor power.

One of the important advantages of the switch in accordance with the present invention is that it and its associated transmission lines are much smaller and at the same time more efficient and reliable than devices used in the past for comparable purposes.

Accordingly, one object of the present invention is to provide a method of and means for switching a radio frequency transmission line capable of carrying a very large amount of power.

Another object is to provide a switch for high power radio frequency currents which has a very low insertion loss.

Still another object is to provide a switch which is free from spurious responses.

A further object is to provide a switch having a very low standing wave ratio or reflection coefficient.

A still further object is to provide a switch which is reliable and free from voltage breakdown, corona or other high voltage troubles.

Another object is to provide a switch which operates very reliably in a very short period of time.

A further object is to provide a high power radio frequency switch which is enclosed and well protected from the weather.

These and other objects will be apparent from the detailed description of the invention given in connection with the various figures of the drawing.

BRIEF DESCRIPTION OF THE DRAWING

FIG. 1 illustrates the basic application of the cross-bar switch of the present invention to a switching bay of transmitters and antennas. The transmitters are illustrated by the blocks designated A, B, C, D, E, F, G, and H while the antennas are illustrated by the circles designated I, J, K, L, M, N, O, and P. Transmission lines 1, 2, 3, 4, 5, 6, 7, and 8 extend from the transmitters A through H in order. Thus, without switching, line 1 connects transmitter A to antenna M, line 2 connects B to N, 3 connects C to O, 4 connects D to P, 5 connects E to I, 6 connects F to J, 7 connects G to K, and 8 connects H to L. However, the switch in accordance with the present invention is located at each cross-over between the transmision lines going in one direction and those going at right angles. These switches are intended to permit connecting any transmitter to any antenna. For example, transmitter A is connected to antenna M by means of direct transmission over line 1 but can be connected to antenna P by switching to line 8 at the intersection between lines 1 and 8 and then to line 4 at the intersection between lines 8 and 4. It will be noted that switching from line 1 to line 8 involves a left turn whereas switching from line 8 to line 4 involves a right turn. In order to be completely flexible the switch in accordance with the present invention is to provide in one form to switch right and in another form to switch left.

FIG. 2 shows in somewhat more detail how the switches in accordance with the present invention are located at the intersections between the right angled transmission lines. The general designations of the lines 2, 3, 6, and 7 may be take to particularly designate the shields which surround the actual line conductors 9, 10, 11, 12, 13, 14, 15, and 16. At the cross-over between lines 2 and 6 is located a switch generally designated 17; at cross-over between lines 3 and 6 switch 19; lines 7 and 2 switch 18 and lines 7 and 3 switch 20. FIGS. 3 through 10 (except FIG. 7) will be particularly directed to the details of one of these switches showing its construction and mode of operation.

FIG. 3 is an external view of a typical switch constructed in accordance with the present invention. This switch is typical of those shown in FIG. 2 but this FIG. 3 is a showing of a single line cross-over switch and is in somewhat more detail. Two transmission lines, one contained in rectangular shield 2 and the other contained in rectangular shield 6 comprise conductors 13 and 14 in shield 2 and conductors 9 and 10 in shield 6. Lines 13 and 14 are supported and insulated from shield 2 by a number of suitably spaced stand-off insulators two of which are shown as 23 and 24. The disposition of other insulators along lines 13 and 14 and details of the insulators themselves will be described below in connection with other figures of the drawing. Similarly two of the insulators, namely, 21 and 22 are shown supporting lines 9 and 10 respectively. The switch proper is located in the area of intersection between shields 2 and 6 and is housed under a raised area 17. Portions of the switch mechanism projecting above raised area 17 are accommodated within the cylindrical shields 25, 26, 27 and 28. The driving mechanism for the switch is not shown in this view and projects downward below area 17 as will be described below especially in connection with FIG 8.

FIG. 4 shows a switch in accordance with the present invention with shields and insulators omitted so that the construction can be more readily understood. The position of the switch in this figure may be called the straight through position. Lines 40 and 41 are connected to lines 13 and 14 and lines 9 and 10 are connected to lines 29 and 30. Switch jaws 44 connect line 40 with the straight switch section 43 which in turn is connected to line 13 by jaws 147. Similarly, jaws 45 connect line 41 with straight switch section 42 and in turn the latter is connected to line 14 by jaws 46; jaws 136 and 137 connect line 9 with straight switch section 32 and the latter with line 29; and jaws 38 and 39 interconnect line 10, section 31 and line 30. The lines 9, 10, 13, 14, 29, 30, 40, and 41 are supported by means of rectangular insulators mounted on the shielding ducts (see 3 and 6 in particular) not shown. The straight switch sections 31, 32, 42, and 43 are supported on cylindrical insulators 33, 34, 35, and 36 which also holds bent switch sections 47 and 48 in correct relative positions. Bent switch sections 47 and 48 are substantially of equal length in order to maintain the line impedance substantially constant through the switch. These posts also couple the switch sections to the actuating mechanism particularly shown in FIG. 8.

FIG. 5 is a view of the same internal parts as shown in FIG. 4 and described above but with the switch actuated to its second position. The active switch blades or sections have been moved downward removing the straight sections or blades 31, 32, 42 and 43 from the circuit and completing the circuits between lines 9 and 10 and lines 14 and 13 respectively by means of bent sections 47 and 48. Bent section 47 is connected to line 9 by jaws 38' and its other end to line 14 by jaws 46. Bent section 48 is connected to line 10 by jaws 38 and to line 13 by jaws 46'. Thus, lines 9 and 10 are switched to lines 13 and 14 extending at right angles. These bent sections 47 and 48 are formed to maintain the transmission line impedance from lines 9 and 10 to lines 13 and 14 so that little or no radio frequency reflections take place in the switching area. This is accomplished by maintaining the bent switch sections substantially parallel, equally spaced and substantially equally spaced from the ground shields surrounding the lines and switch. The jaws are also formed to provide broad contact surfaces and to be free from bulges when meshed. The switch sections or blades enter and leave all lines in a straight line and all bends are made smoothly and with sufficient radii to prevent corona or arcing. All of these novel features result in switches causing very little reflection or losses making them suitable for handling large amounts of power while running cool.

FIG. 6 is a view of the switch in the position shown in FIG. 4 and described above and showing the insulators used to support the transmission lines entering and leaving the switch. The insulators are of a form and material and are located to cause very little dielectric loss and at the same time provide means for supporting high radio frequency voltages on the lines. The insulators (49, 52, 55, 58, 61, 62, 63, 64, 65, 66, 67, 68, 69, 70, 59, and 60) are formed of homogeneous ceramic material without any extraneous devices such as metal caps or lugs of any kind. Each insulator carries a hole, such as hole 50 in insulator 49, adapted to pass the pipe constituting one of the trasmission lines. Tapped holes, such as holes 56 and 57 in insulator 55 are provided for attaching the insulators to the shields. Also holes opposite the line clearance holes, such as hole 51 in insulator 49, are provided so that a pin of insulating material can be passed through a hole in the line to prevent longitudinal movement of the lines relative to the shields.

FIG. 7 is a detail of a clamp suitable for interconnecting the line conductors such as connecting line 9 with another line 71. The clamp comprises a metal tube 72 having internal spring fingers inside at each end as at 73 and a set-screw 75 for preventing longitudinal shift once the coupling is in place. When lines, as lines 9 and 71, are interconnected, a space as at 74 is left between the ends of the lines to permit longitudinal expansion or contraction of the lines caused by heating or cooling.

FIG. 8 is a skeleton view of a switch in accordance with the present invention together with the essential mechanism for operating such a switch. Various supporting or shielding means are omitted for clarity. The switch blade support rods 33, 34, 35, and 36 are mounted on a rectangular plate 76. When this plate is raised or lowered, the switch blades are raised or lowered accordingly. The mechanism for raising and lowering plate 76 includes a motor 87 powered over lines 88–89. Motor shaft 90 carries spur gear 86 which meshes with a second spur gear 85 mounted on and turning shaft 84. Shaft 84 carries and turns worm 83 which in turn drives worm gear 82. The shaft 77 of worm-gear 82 is attached to plate 78 which in turn is spring coupled to plate 81 by means of springs 79 and 80. When motor 87 is energized over leads 88–89, shaft 77 is moved up or down at a rate dependent on the motor shaft speed, the ratio of gears 85–86 and the ratio of worm 83 and worm-gear 82. This motion of shaft 77 carries plates 78 and 81 and in turn plate 76 and the switch support rods and hence the switch sections causing the switch to actuate. The end of shaft 77 carries a collar 92 adapted to actuate the two limit switches 94 and 95 mounted on a suitable support, not shown, by plate 93. These limit switches are located so that shaft 77 overtravels a certain amount beyond the position that would actuate the switch in either position. This causes plate 78 or plate 81, depending on the switch direction, to bring the switches into their proper operating positions and then to apply spring transmitted pressure through springs 79 and 80 insuring soft but positive operaton of the switches.

FIGS. 9 and 10 show how unused switch sections are shielded from the operating circuits and are also grounded to prevent any parasitic coupled circuits from disturbing the active transmission lines. In FIG. 9 inactive switch arms 47 and 48 have been moved through slots 99 and 100 in shield 103 and the ends are grounded to shield 103 by ground clips 101 and 102. Also the lower ends of arms 47 and 48 are grounded to shield 96 by ground clips 97 and 98.

FIG. 10 illustrates how the perpendicularly disposed switch arms pass through slots 112 and 115 in upper shield 111 and through slots 105 and 106 in lower shield 104 when these arms are in the down and inactive position. These arms after passing through the slots in the shield are grounded by ground clips 113, 114, 116, 117, 107, 108, 109, and 110 carried by grounded shield plates 111 and 104. Here again the unused switch arms are shielded from the active circuit and are grounded outside the active channels to prevent parasitics.

Figures 1, 2, 3:
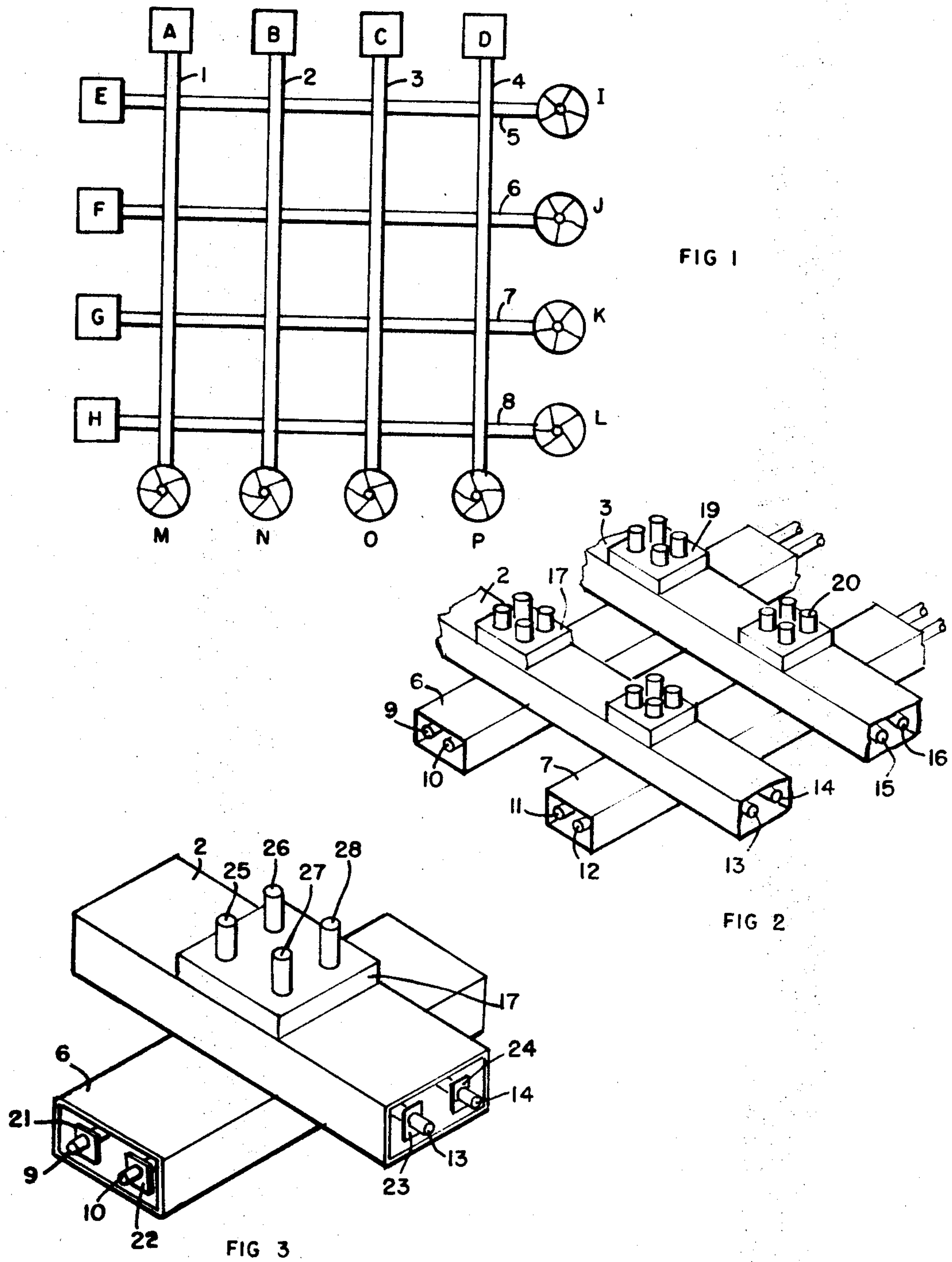
FIG. 1 is a simplified diagram of a switching bay matrix interconnected by means of a number of cross-bar switches in accordance with the present invention.
FIG. 2 is a somewhat more detailed view of four switches and two pairs of crossed transmision lines in shielding ducts.
FIG. 3 is an external view of a typical switch in accordance with the present invention.
Figure 4:
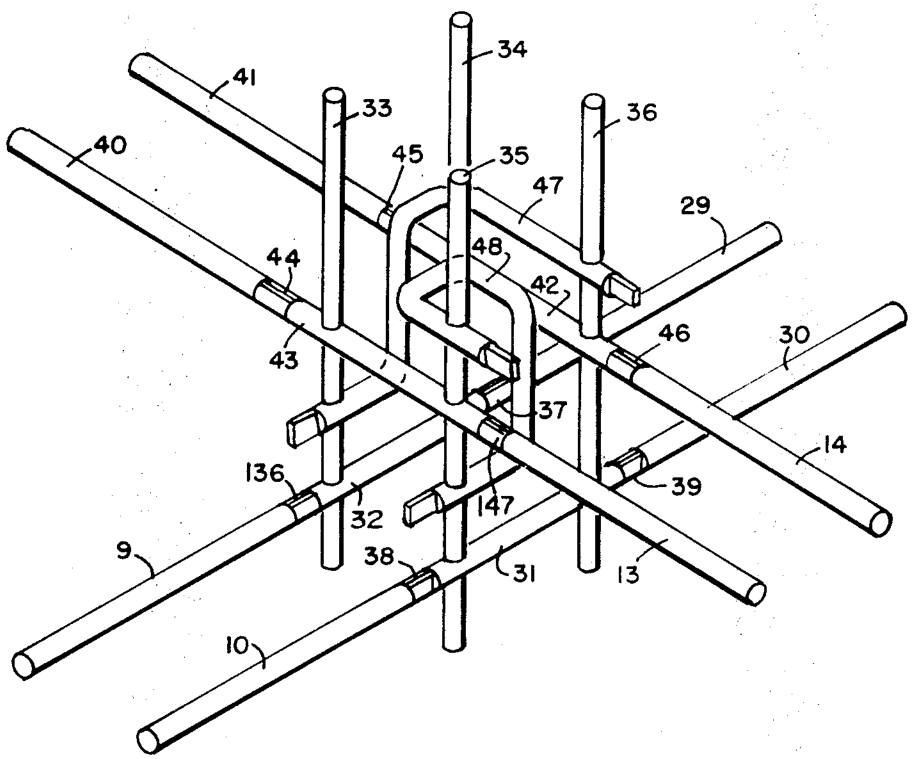
FIG. 4 is a view in perspective of the exposed switch in the straight through position.
Figure 5:
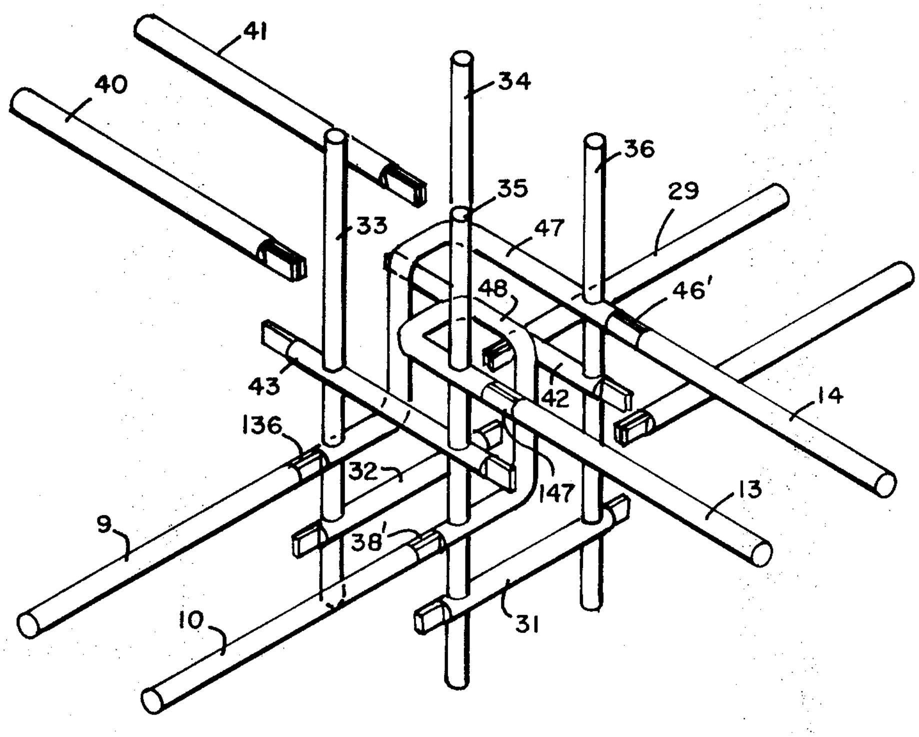
FIG. 5 is a view in perspective of the exposed switch in the right angle switching position.
Figure 6:
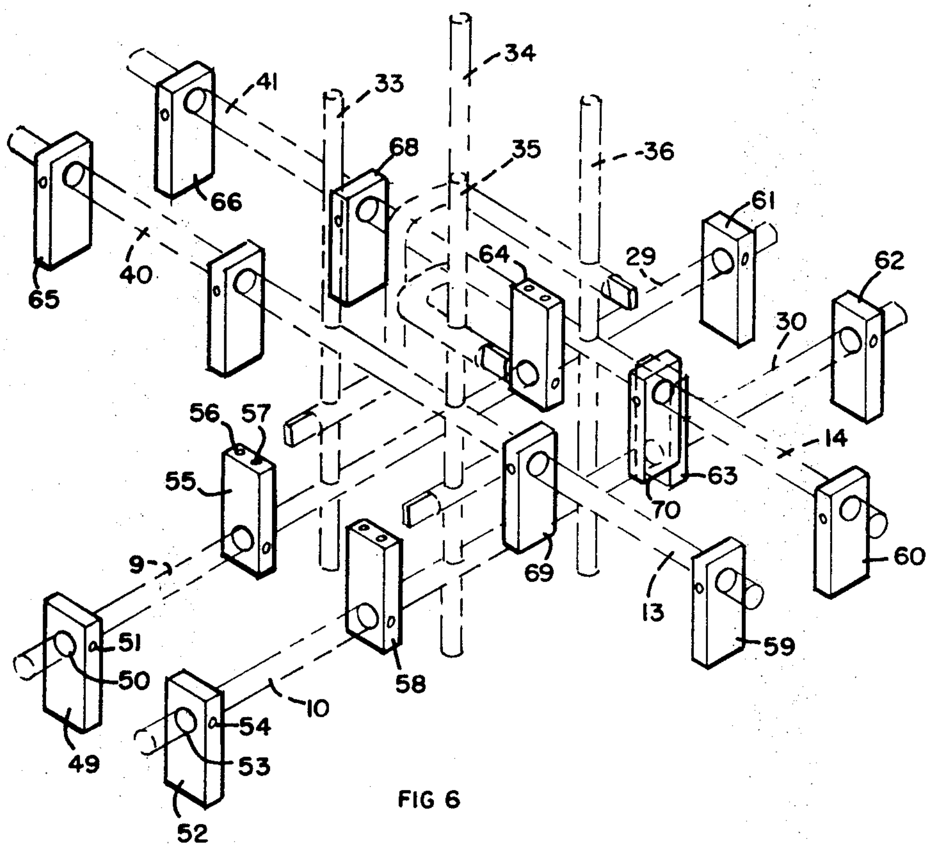
FIG. 6 is a perspective and phantom view illustrating how the lines are insulated from the ducts.
Figure 7:
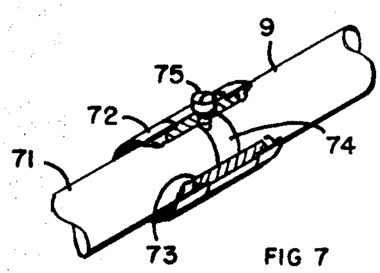
FIG. 7 is a detail of the coupling for interconnecting sections of transmission line.
Figure 8:
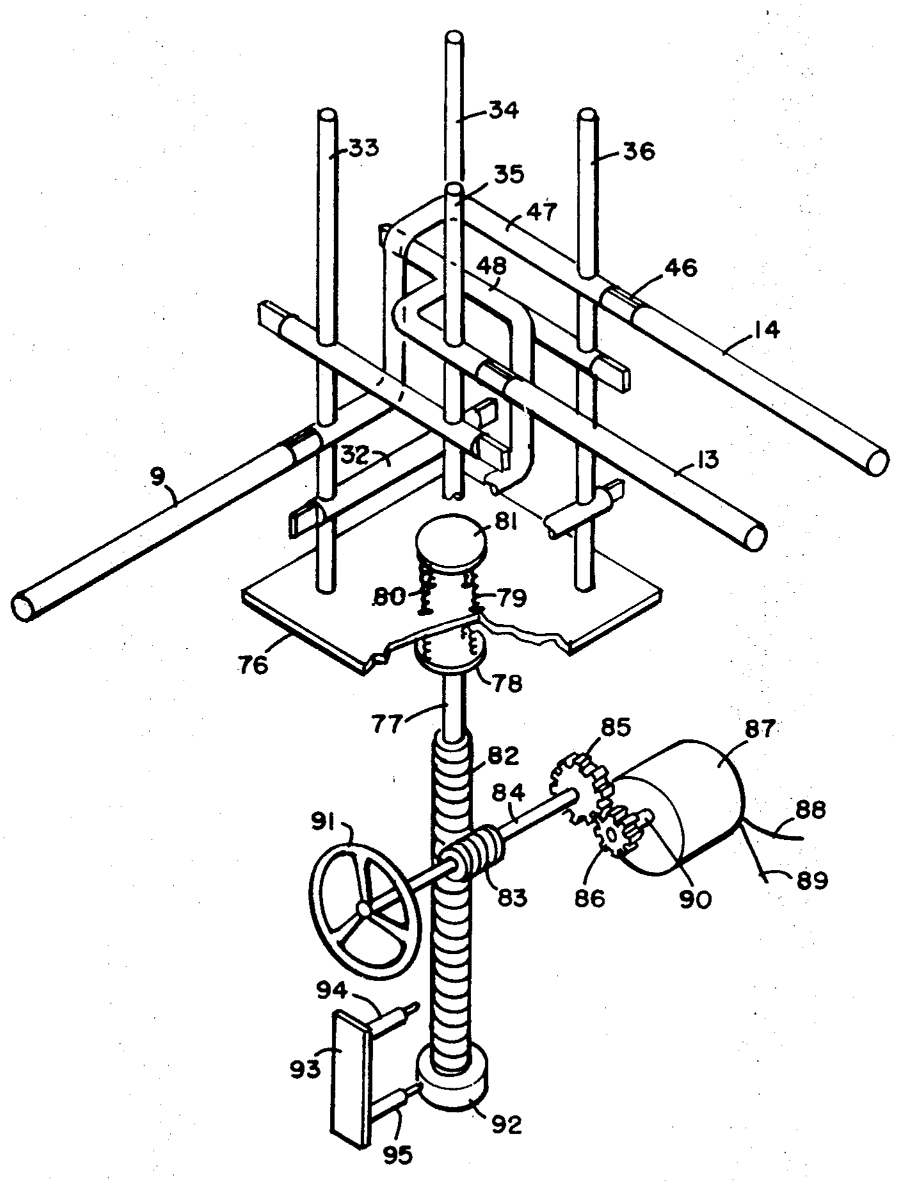
FIG. 8 is a view in perspective of the switch actuating mechanism.
Figure 9:
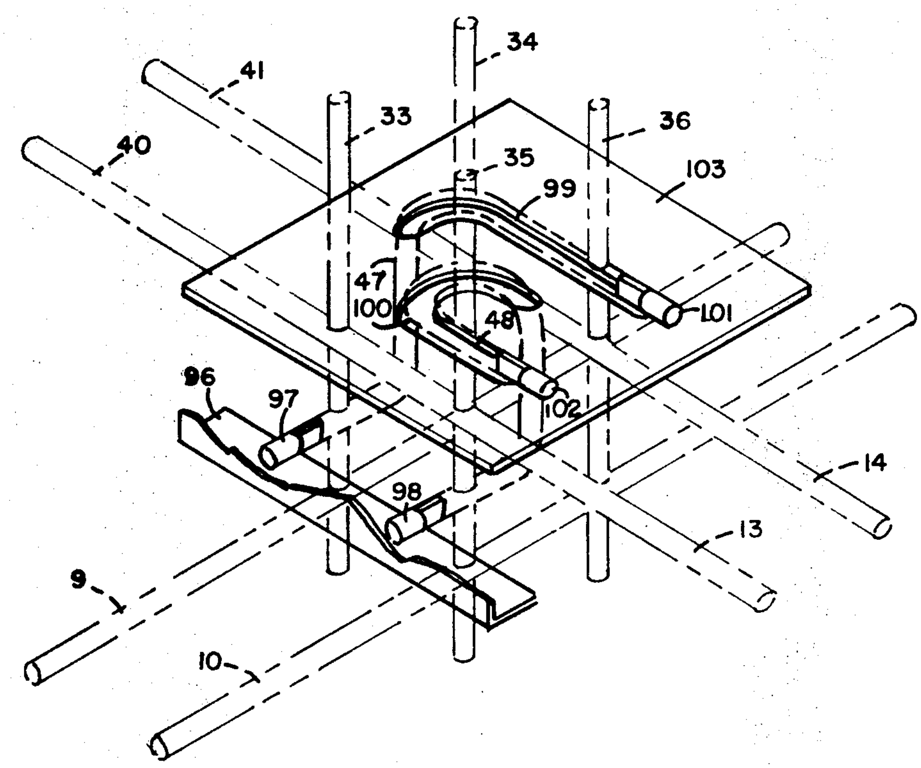
FIG. 9 is a perspective and phantom view showing the grounding of the right angle switching arms when not in use.
Figure 10:
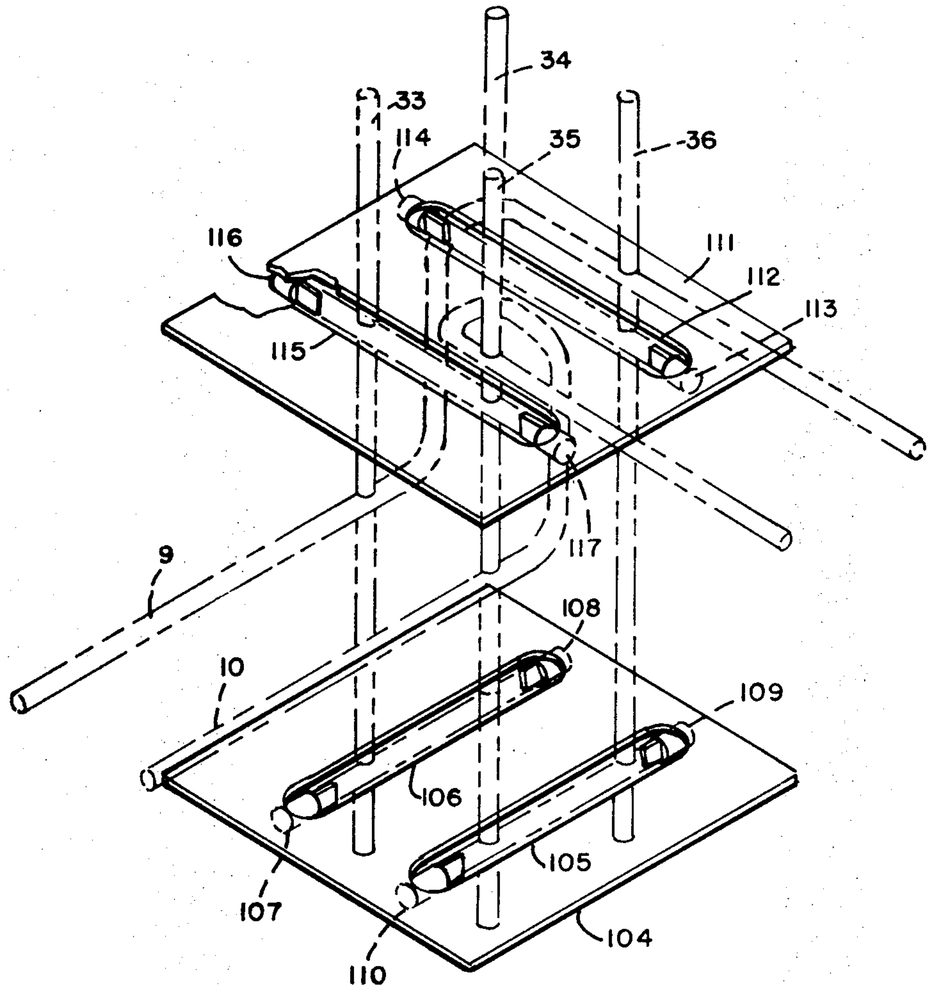
FIG. 10 is a perspective and phantom view showing the grounding of the straight through switch arms when not in use.

While only one form of the present invention has been shown and described, many modifications will be apparent to those skilled in the art and within the spirit and scope of the invention as set forth in particular in the appended claims.

What is claimed is:

1. A high power radio transmisson switch for switching between first and second stationary transmission lines at right angles to each other and stacked one above the other comprising: switch means movably positioned at the intersection of said lines, said switch means including a straight section parallel to the first transmission line, a bent section with one end parallel to said first transmission line, and the other end parallel to said second transmission line, and a further straight section parallel to said second transmission line, said straight sections engaging said transmission lines in a first switch position and said bent section engaging said lines in a second switch position so that current flows fom one line to the next in said second switch position while no current flow in said first switch position.

2. A high power radio frequency transmission line switch as set forth in claim 1;

and including an extension of said first transmission line;

an extension of said second transmission line;

two linear switch means for connecting the first transmission line with said first extension;

and two linear switch means for connecting the second transmission line with said second extension;

for operating both first and second transmission lines straight through.

3. A high power radio frequency transmission line switch as set forth in claim 2;

and including means for grounding said movable switch means.

4. A high power radio frequency transmission line switch as set forth in claim 1;

and including motor driven means for moving said movable switch means between said two positions.

5. A high power radio frequency transmission line switch as set forth in claim 4;

and including rectangular shields surrounding each of said transmission lines.

6. A high power radio frequency transmission line switch as set forth in claim 5;

and including openings in said shields to permit unused switch means to be moved out of the shielded area of a given transmission line;

and means for grounding said unused switch means to said shields outside said shielded area.

7. A high power radio frequency transmission line switch as set forth in claim 1;

and including a plurality of rectangular feed-through insulators for supporting said transmission lines in predetermined positions.

8. A high power radio frequency transmission line switch as set forth in claim 1;

wherein said movable switch means and said transmission lines are terminated in knife-switch means for providing low resistance sliding contact connections.

9. A high power radio frequency transmission line switch as set forth in claim 4;

and including resilient means for attaining said two positions under the urging of a predetermined applied force.

10. A high power radio frequency transmission line switch as set forth in claim 4;

and including hand wheel operable means overriding said motor driven means for actuating said switch by hand.

References Cited

UNITED STATES PATENTS

| | | | |
|---|---|---|---|
| Re. 24,586 | 1/1959 | Davis | 200—5 X |
| 2,667,542 | 1/1954 | Wright | 200—1 X |
| 2,851,560 | 9/1958 | Billeter. | |
| 2,916,674 | 12/1959 | Dix | 317—112 |
| 2,955,168 | 10/1960 | Schacht | 335—111 |
| 3,188,423 | 6/1965 | Glenner et al. | 200—5 |
| 3,223,812 | 12/1965 | Wright et al. | |
| 3,233,050 | 2/1966 | McKee | 200—1 X |
| 3,255,318 | 6/1966 | McKee | 200—1 |
| 3,257,534 | 6/1966 | Kesselring et al. | |
| 3,387,108 | 6/1968 | Reimer | 200—175 |

ROBERT K. SCHAEFER, Primary Examiner

R. A. VANDERHYE, Assistant Examiner

U.S. Cl. X.R.

200—1, 175